(No Model.)
J. E. GILLESPIE.
HOSE COUPLING.
No. 244,804.  Patented July 26, 1881.
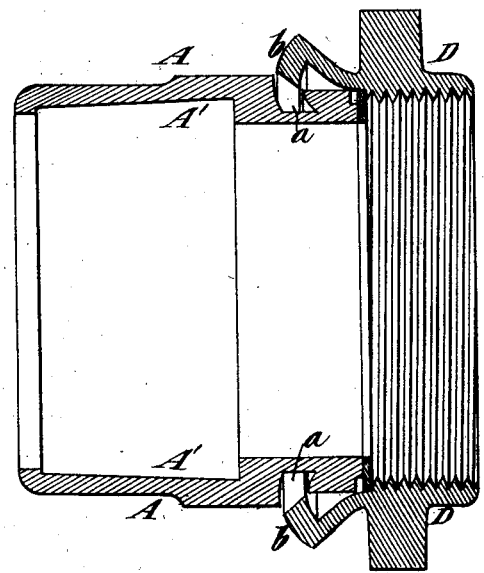
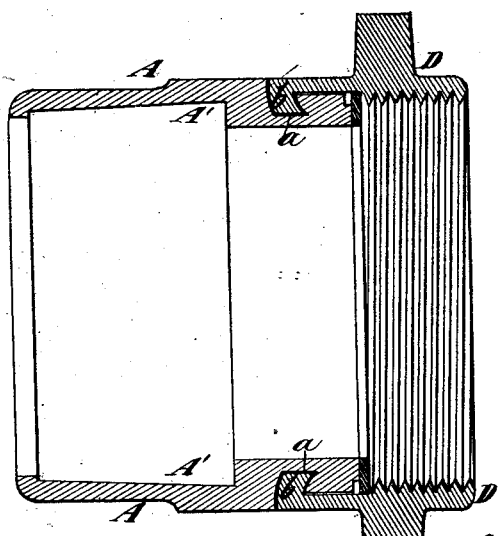
Witnesses
John Becker
Fred Haynes
Inventor
James E Gillespie
by his Attorneys
Brown & Brown

UNITED STATES PATENT OFFICE.

JAMES E. GILLESPIE, OF WARWICK, NEW YORK, ASSIGNOR TO ROBERT J. GILMORE, OF PROVIDENCE, RHODE ISLAND.

HOSE-COUPLING.

SPECIFICATION forming part of Letters Patent No. 244,804, dated July 26, 1881.

Application filed November 26, 1880. (No model.)

*To all whom it may concern:*

Be it known that I, JAMES E. GILLESPIE, of Warwick, in the county of Orange and State of New York, have invented a certain new and useful Improvement in Hose-Couplings, of which the following is a specification.

My improvement relates to that class of hose-couplings which embody a tail-piece and a swivel joined by an annular lip and an annular groove, one or the other of said main parts being expanded or contracted for causing the lip and groove to occupy engaging relations with respect to each other.

The object of my invention is to provide for a perfectly reliable union of the swivel and tail-piece, and I attain that end by what I term the "undercutting" of the front surface of the groove, and having the coincident or bearing surface of the annular lip so correspond therewith that they loosely interlock, as against outward or radial displacement of the lip. Prior to my invention a straight-sided groove and a straight-sided lip have been employed, and therefore whenever such couplings are subjected to severe tensile strains, as in use, there is no locking of the lip to the groove, as against that radial or outward displacement liable to occur with heavy tensile strain, especially if the lip be originally a light one or has become worn by long use.

In the accompanying drawings, Figure 1 represents a longitudinal section of a tail-piece secured upon a piece of hose, and a swivel to be permanently connected or attached thereto, according to my invention, it not yet being contracted to cause its lip to enter the annular groove in the tail-piece; and Fig. 2 represents a corresponding view after the swivel has been contracted to cause its lip to enter said groove.

Similar letters of reference designate corresponding parts in both the figures.

A designates a tail-piece of a hose-coupling which is constructed with the ordinary taper hose-chamber, A', in which a piece of hose may be secured by means of a ring of brass or copper, which is expanded in the ordinary way to crowd the hose outward against the taper interior of the hose-chamber and firmly secure it therein.

D designates a swivel, which is provided with an internal screw-thread for engaging with an external screw-thread upon a tail-piece similar to the tail-piece here shown, and which has a piece of hose secured therein in a similar manner. The swivel D has the usual wrench horns or studs, as shown, and they should be placed as nearly to the groove $a$ and lip $b$ as may be practicable. The front side of the groove $a$ is undercut, as shown, and the corresponding face of the lip $b$ is so formed that when the lip has been forced inwardly by external annular compression on the neck of the swivel the coincident surfaces of groove and lip will substantially correspond, as clearly shown in Fig. 2. It will be seen that when the parts are thus joined the lip is so hooked into the groove that tensile strain on the coupling can, under no circumstances, cause the lip to be radially displaced from said groove. It will also be seen that the wear of these surfaces will be practically uniform, and that they will therefore continue to maintain substantially the same relations until the lip is so far worn away as to cause it to break at its junction with the side of the swivel, whereas without the undercut feature the lip, when worn thin, would bend outwardly and thereby disengage itself from the groove.

I claim as new and desire to secure by Letters Patent—

The combination of the swivel and tail-piece, respectively provided with an annular lip and an undercut groove, substantially as described.

JAMES E. GILLESPIE.

Witnesses:
 FREDK. HAYNES,
 A. C. WEBB.